July 2, 1963     T. R. KOMLINE     3,096,279
FLEXIBLE BELT FILTER UNIT
Filed Dec. 23, 1959
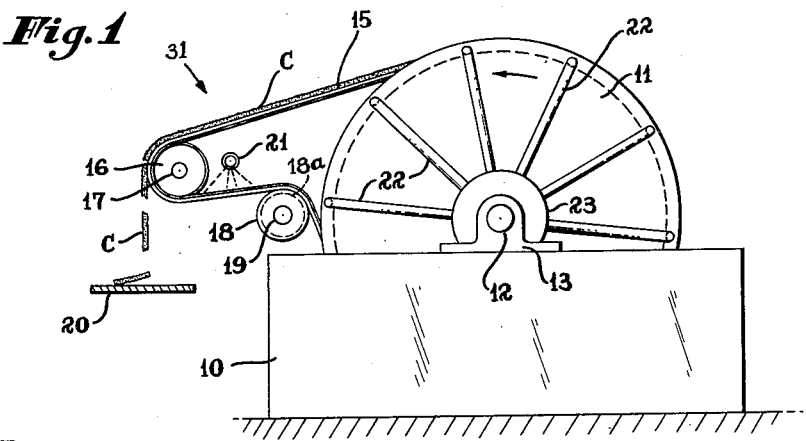
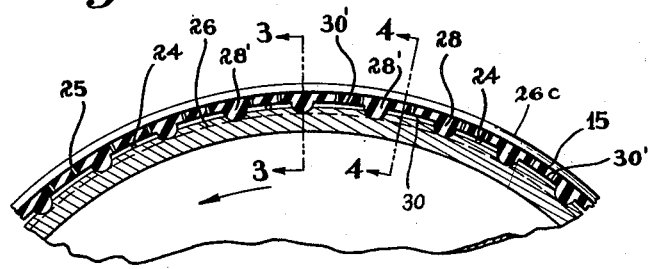
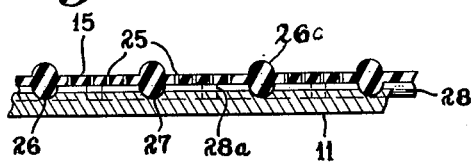
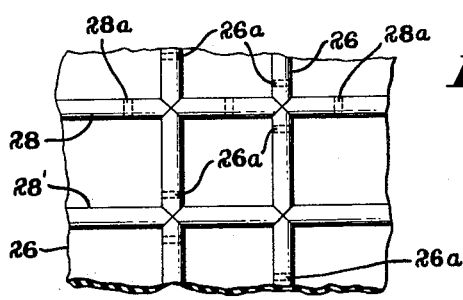
THOMAS R. KOMLINE
INVENTOR.
BY Watson, Cole, Grindle & Watson
ATTORNEYS

United States Patent Office
3,096,279
Patented July 2, 1963

3,096,279
FLEXIBLE BELT FILTER UNIT
Thomas R. Komline, Gladstone, N.J., assignor to Komline-Sanderson Engineering Corporation, Peapack, N.J., a corporation of New Jersey
Filed Dec. 23, 1959, Ser. No. 861,534
5 Claims. (Cl. 210—391)

This invention relates to a flexible-belt type vacuum filtering unit and more particularly to an improved structure and mode of cooperation of and between the porous filter belt or media and its associated elements.

The primary objects of the invention are to improve the tracking of the flexible filter belt around the filter drum and its associated discharge and guide rolls; to avoid wrinkling of the filter belt incident either to lateral contraction transversely to its movement or to local advancing or retarding of some portions of the belt relative to others with respect to the belt movement; and to facilitate the removal of the filter cake from the belt. Also, it is an object to facilitate the removal of solid matter from the pores of the belt.

In order to achieve the foregoing objects and advantages, the invention contemplates providing the flexible porous filter belt with a plurality of parallel guide ribs extending lengthwise along its inner surface for reception in encircling guide grooves in the filter drum, in order to secure accurate tracking of the belt around the drum at all times, as well as to prevent relative lateral local displacement of portions of the belt such as would result in wrinkling.

Moreover, a positive drive is afforded between the drum and the belt across the entire width of the belt, by the provision of relatively transverse traction ribs on the inner face or surface of the belt, which ribs are received in meshing relation in transverse or axial slots across the periphery of the drum, so that the slots and traction ribs cooperate in the manner of gearing or sprocket teeth. Because of this, relative local displacement of any portion of the belt with respect to the remainder thereof in the direction of belt travel is avoided.

It is usual in a filter of the type here involved to withdraw the filtered effluent from between the drum periphery and the belt by means of a plurality of vacuum passages communicating with the space between the belt and the drum at intervals around the drum periphery. This necessitates, from a functional standpoint, that the aforesaid space be subdivided, as by means of conventional sealing strips, into relatively isolated sectors or compartments, whereby the vacuum or suction exerted on each sector may be discontinued during the period when that portion of the belt overlying a particular sector departs from the drum to commence its travel over the discharge roll. It has been customary in the past to support the aforesaid sealing strips directly on the drum. However, in accordance with the invention, it is proposed to form the sealing strips on the inner surface of the belt, it being apparent that the positive drive established through the traction ribs and grooves may be utilized to govern the proper relative positionnig between these sealing strips and the vacuum passages.

Moreover, the sealing strips may advantageously be formed and utilized to perform dual functions, both as sealing strips and traction ribs.

In order to facilitate removal of the filter cake from the belt, it is contemplated, in accordance with the invention, to form the belt in its entirety of a resiliently stretchable porous material, such as porous rubber, whereby it may be stretched in passing from the drum to and around the discharge roll to thus weaken and/or destroy the adherance between the belt and the filter cake. It will be apparent that the stretching action will serve also to deform the filter pores in the belt to thus assist in freeing solid material from them. In order to restore the belt to its unstretched condition as it returns from the discharge roll to the drum, the traction ribs and their cooperating grooves are radially tapered or wedge-shaped to be successively displaced forwardly in the direction of the drum rotation, incident to the resulting camming action between the sides of the grooves and the ribs. To this end, it will be apparent that a suitable taper or wedge shape for the purposes of this invention may include a substantially semicircular cross-sectional configuration, or the like.

In the accompanying drawings, wherein there is illustrated a preferred embodiment of the invention:

FIGURE 1 is a side elevation of a generally diagrammatic nature of a complete filter unit embodying the invention;

FIGURE 2 is a fragmentary radial cross-sectional view of the upper portion of the filter drum and filter belt as applied therearound;

FIGURE 3 is a fragmentary cross section on the line 3—3 of FIGURE 2;

FIGURE 4 is a cross section on the line 4—4 of FIGURE 2; and

FIGURE 5 is a fragmentary plan view of a portion of the filter belt of the invention as viewed from its inner side.

Referring now in detail to the accompanying drawings, and first considering the general organization of elements as illustrated diagrammatically in FIGURE 1, the numeral 10 designates in its entirety a usual upwardly opening vat or tank, generally of rectangular configuration, and adapted to contain a supply of admixed liquid and solid material to be filtered. Such material may comprise sewage sludge, industrial wastes, chemical slurries, or the like. In accordance with usual practice, suitable means, constituting no part of this invention, functions to supply the tank contents and maintain same at a substantially constant level.

Rotatably supported across the tank 10 is a filter drum 11, the supporting shaft 12 of which is rotatably supported at its opposite ends as by means of bearings such as 13, secured on the tank and walls. The arrangement is such that the lower portion of the drum 11, depending within the tank 10, projects substantially beneath the surface of the liquid tank contents.

Operatively disposed and guided around the periphery of the drum 11 is a flexible endless and porous filter belt, designated 15 in its entirety. The belt 15 extends from the drum 11 around a discharge roll 16, which is supported in suitable manner for rotation about a horizontal shaft 17, then after passing over and partially around a guide roll 18 is returned back onto the drum 11. Guide roll 18 is supported for rotation about a horizontal shaft 19.

The drive preferably is imparted in any suitable manner, not here illustrated, to the drum 11, whereby the upper portion of the drum is caused to rotate toward the discharge roll 16 as indicated by the arrow in FIGURE 1. In accordance with entirely conventional practice, the filter cake C, which is formed on the belt incident to the filtering action, is discharged as the belt moves around the discharge roller 16. The fragments c of the discharged filter cake may be received on a conventional endless conveyer 20 operatively positioned beneath the discharge side of the roller 16, to be transported to any desired disposal or treatment point.

To assist in removing solid materials or particles from the pores of the filter belt following discharge of the filter cake, there may be provided a usual spray head 21, arranged to project a spray or jet of water onto the inner surface of the belt 15 between the rolls 16 and 18.

As is also usual in this type of filtering apparatus, and as will be more specifically brought forth hereinafter, the main body portion of the porous belt 15 is spaced radially from and out of contact with the generally cylindrical periphery of the drum 11 to define a generally annular space 30 for the reception of the liquid effluent, which is drawn through the pores 25 in the belt by suction transmitted to this annular space. It is, of course, desirable that this suction be discontinued or disrupted on that portion of the drum periphery which is left open to the atmosphere as the belt moves from the drum over the rolls 16 and 18. Because of this and in accordance with usual practice, the aforesaid annular space 30 is subdivided by means hereinafter described into relatively isolated, but circumferentially adjoining, sectors or compartments, each of which communicates with a conduit 22 (FIGURE 1) defining a suction passage 24 between its respective compartment or sector and a conventional control valve 23. The valve 23 is of conventional structure including the fixed outer portion thereof and an internal rotor (not shown) which is secured to and rotates with the drum. In accordance with usual practice, it disrupts the vacuum or suction through each conduit 22 as the particular sector with which its passage 24 communicates is uncovered by the belt 15, as the latter passes over the rolls 16 and 18. Of course, when the aforesaid sector rotates to a point where it is again covered by the belt 15, the valve 23 functions to again place its associated conduit 22 and passage 24 in communication with the source of suction. The foregoing, of course, will be well understood by those skilled in this particular art.

Referring now specifically to the novel cooperating features of the drum and the belt 15, it will be seen, by referring to FIGURES 3 to 5, inclusive, that the belt has its main body formed of a porous and preferably elastically stretchable sheet material, such as rubber. It will be noted that the belt is provided over its area with a plurality of substantially uniformly distributed pores 25, best seen in FIGURES 2 and 4, which extend completely through the belt. The size and distribution of these pores is selected in such manner as to govern the degree and rate of filtering action in usual manner. The particular type of belt here employed may have its body portion formed substantially in the manner disclosed in the Jordan patents, 2,032,942 and 2,272,175.

For the purpose of securing and maintaining accurate alignment of the belt at all times with respect to the drum 11 and rolls 16 and 18, the belt has secured on its inner surface a plurality of radially inwardly projecting ribs 26 which extend parallel to each other in a direction lengthwise of the belt and its direction of travel. These ribs 26 may be either formed integrally with the belt or formed separately and fixedly secured thereto as by cementing or vulcanizing. The aforesaid ribs are normally received at their free inner ends in generally conformingly shaped guide grooves 27, which encircle the drum in relatively spaced radial planes. The spacing between the centers of adjoining grooves 27 is, of course, equal to the spacing between centers of relatively adjoining ribs 26, to thus maintain the belt at all times fully extended in the direction of the axis of the drum.

In addition, it is desirable to form the guide roller 18 with guide grooves 18a in alignment (or in other words, in common planes with) the respective guide grooves 27 of drum 11. Outer guide ribs 26c secured on the outer face of the filter belt, are disposed in registry with the guide ribs 26, for guiding reception in the grooves 18a. The cooperating sets of guide ribs and grooves 26—27 and 26c—18a thus function to accurately align with the drum, the portion of the belt which is moving back toward the drum after passing around the discharge roller 16.

Further, and for the purpose of securing a positive driving connection between the drum and the belt, the belt has formed on its inner surface a plurality of traction ribs 28 and 28', which extend transversely of the belt and are adapted for reception in traction grooves 29, extending axially of the drum periphery.

The ribs 28 and grooves 29 obviously will cooperate in a manner equivalent to that of gear teeth in intermeshing relation. Since the spacing between relatively adjoining grooves 29 will normally be equivalent to the spacing between their cooperating adjoining ribs 28, 28', it will be readily apparent that any local stretching or contracting of the belt, and thus any local retarding or advancing of the belt, with respect to the remainder thereof in its direction of travel, will be avoided. Because of this, and because of the action of the guide ribs and their cooperating grooves, the belt will be normally maintained in a completely wrinkle-free condition about the drum 11.

In order to space the inner surface of the belt 15 from the drum periphery and thus provide the annular space 30 encircling the greater portion of the drum, the ribs 26, 28 and 28' are preferably formed of greater radial depth than the grooves which receive them. Moreover, in order to facilitate their proper seating in the grooves and in effect to cam them into the grooves, in the event they are somewhat out of registry therewith, preferably the ribs of both series, 26, 28 and 28', and their cooperating grooves, are formed of radially inwardly tapered or, as in the present embodiment, semi-circular cross-sectional conformation.

As has been earlier mentioned, it is desirable to subdivide the space 30 into relatively adjoining but isolated sectors or compartments, each of which communicates with one of the suction passages 24, all to the end that the suction within certain compartments may be discontinued temporarily at predetermined points in the rotation of the drum independently of the other compartments or sectors.

For the purpose of thus subdividing the space 30, it is preferred to utilize certain of the traction ribs, these being designated in each case by the reference character 28'. These sealing strips or ribs 28' are so relatively spaced and disposed that one of them is positioned on the drum between each adjoining pair of suction intake openings 24, and the sector or compartment 30' communicating with each said suction intake 24 between adjoining sealing strips 28' has the filtered effluent drained therefrom through the opening 24.

By reference to FIGURE 5 of the drawings, it will be apparent that the ribs 26, 28 and 28' subdivide the inner surface of the belt into a gridlike structure, in which the contacting relationship between the ribs and the drum surface will normally tend to isolate the respective rectangular enclosures defined by the ribs. Since it is essential that these enclosures of each sector communicate with the suction intake opening 24 of that sector, it is necessary to establish such communication in any suitable manner, as by appropriate grooves, passageways, or apertures, in either the drum or the ribs. In the preferred embodiment, this is accomplished by providing each of the ribs 26 and 28 with suitable apertures or passageways 26a and 28a (FIGURE 5), respectively, between the adjoining enclosures defined by the respective ribs. However, it is important that such passageways or openings be omitted from the sealing strips 28' in order that these may efficiently serve their function of isolating relative adjoining sectors and the intake openings 24 of their associated suction conduit 22 from each other.

The elastic quality of the belt 15 in its entirety makes possible its novel cooperation with the other structure to obtain an improved manner of facilitating the removal of the filter cake. By way of explanation, the total length of the filter belt 15 is somewhat less than the length of the endless circuit through which it moves, as defined by the drum 11 and rolls 16 and 18 and, if necessary to this end, either or both of the rolls 16 and/or 18 may be rendered adjustable in its position, in well known manner, for the purpose of tensioning and stretching the belt 15.

By virtue of the intermeshing ribs 28 and grooves 29, that portion of the belt which extends around and in engagement with the drum periphery is retained against stretching. Therefore, the stretching will be limited to the remaining portion of the belt which passes around the rollers 16 and 18.

Thus, in operation, as the belt with its supported filter cake C moves from the drum 11 toward and around the discharge roll 16, throughout the portion designated by the numeral 31 in FIGURE 1, with the result that the normally inelastic filter cake C thereon is cracked and its adherence to the belt considerably decreased, whereupon the filter cake in passing around the discharge roller 16 will normally be discharged and will then be transported away in usual manner on the conveyor belt 20, which receives them. That portion of the belt between the rollers 16 and 18 will also be maintained under tension and stretched. Obviously, the stretching will deform the pores 25 through the belt and this will tend to loosen and facilitate the dislodging of any solids or particles which have entered and tend to clog these pores. It will be apparent that the cleansing spray or jet of fluid from the spray head 21 is directed and will impinge against the belt while the latter is in its stretched condition, with the pores thus deformed, to flush the solids therefrom. Thus, the fluid spray may function readily to clear the pores.

As the stretched portion of the belt returns back onto the drum 11 for movement around its periphery, it will be apparent that the traction ribs 28, 28', due to the stretching of the belt 15 will normally be somewhat out of registry with their respective grooves 29 in the drum surface. However, because of the semi-circular or generally inwardly tapering cross-sectional shape of both the grooves and the ribs, these will exert a camming action on each other, which will act to properly seat the ribs in their grooves and thus return the belt to its normally substantially unstretched condition.

It will be seen, therefore, that the present invention minimizes various of the operational difficulties to which an endless belt drum type filtering unit has normally been subjected, including the very substantial difficulties of securing proper tracking of the belt around the drum and avoiding wrinkling of the belt. In addition, the ability of the filter to properly and easily discharge its filter cake without undue adherence of the latter, and to maintain its filter pores substantially clean and clear, has been appreciably improved.

In this application I have shown and described but a single preferred embodiment of the invention, merely in order to illustrate the preferred mode contemplated by me of carrying out the invention. However, I recognize that the strucure herein disclosed, and its several inventive concepts are capable of other and different embodiments and that its various details are subject to modification in numerous ways, all without departing from the invention as herein disclosed and as defined in the appended claims.

Having thus described my invention, I claim:

1. A vacuum filtering unit comprising a rotary filtering drum and means supporting same for rotation about a horizontal axis, said drum having a generally cylindrical surface formed with a plurality of axially parallel relatively uniformly spaced traction grooves of inwardly tapering cross-sectional configuration; a discharge roller rotatable about an axis parallel to the rotational axis of the drum and spaced from the drum; a flexible endless porous filter belt operatively disposed around said drum and said discharge roller for movement through an endless circuit incident to rotation of the drum, said belt having fixed on its inner surface a plurality of relatively parallel traction ribs of inwardly tapering cross-sectional configuration conforming generally to said traction grooves, said traction ribs extending transversely of the belt and positioned for reception in the respective traction grooves for imparting a positive drive to the belt and preventing wrinkling thereof; means supporting said belt around the drum with its inner surface spaced from the drum for reception of the effluent from the filtered material, certain of the said traction ribs being imperforate and extending continuously across the drum to function as sealing strips subdividing said space into relatively isolated sectors; suction means communicating with the respective sectors between adjoining sealing strips, said ribs in each sector between relatively adjoining sealing strips being formed to permit the passage of fluid to the respective suction passages, said belt being formed of elastic material and having a resiliently elongated portion both around said discharge roll and between the said roll and the drum, to facilitate the loosening and discharge of the filter cake from the belt and also to deform temporarily the pores of the belt whereby to facilitate the removal of solids therefrom; the meshing relation between said belt traction ribs and said drum traction grooves together with their tapering cross-sectional configuration functioning to contract said resiliently elongated portion of the belt incident to its return to the drum.

2. A vacuum filering unit comprising a rotary filtering drum and means supporting same for rotation about a horizontal axis, said drum having a generally cylindrical surface formed with a plurality of axially parallel relatively uniformly spaced traction grooves of inwardly tapering cross-sectional configuration; a discharge roller rotatable about an axis parallel to the rotational axis of the drum and spaced from the drum; a flexible porous filter belt operatively disposed around said drum and said discharge roller for movement incident to rotation of the drum, said belt having fixed on its inner surface a plurality of relatively parallel traction ribs of inwardly tapering cross-sectional configuration conforming generally to said traction grooves, said traction ribs extending transversely of the belt and positioned for reception in the respective traction grooves; sealing strips carried by the belt for cooperating with the drum to define relatively isolated sectors between the belt and drum, suction means communicating with the respective sectors between adjoining sealing strips, said ribs in each sector being formed to permit the passage of fluid to said suction means, said belt being formed of elastic material and having a resiliently elongated portion both around said discharge roll and between the said roll and the drum, to facilitate the loosening and discharge of the filter cake from the belt and also to deform temporarily the pores of the belt whereby to facilitate the removal of solids therefrom; the meshing relation between said belt traction ribs and said drum traction grooves together with their tapering cross-sectional configuration functioning to contract said resiliently elongated portion of the belt incident to its return to the drum.

3. A filtering unit comprising a rotary filtering drum and means supporting same for rotation about a horizontal axis, said drum being encircled by a plurality of guide grooves in relatively spaced radial planes, and a plurality of axially parallel relatively uniformly spaced traction grooves; a discharge roller rotatable about an axis parallel to the rotational axis of the drum and spaced from the drum; a flexible endless porous filter belt operatively disposed around said drum and said discharge roller for movement through an endless circuit, said belt having fixed on its inner surface a plurality of relatively parallel inwardly projecting guide ribs extending lengthwise of the belt and positioned for reception in said guide grooves to maintain the belt properly aligned on the drum, and a plurality of relatively parallel traction ribs positioned for reception in said traction grooves, said drum and said belt cooperating to define therebetween an enclosed space, certain of the said traction ribs being imperforate and extending continuously across the drum to function as sealing strips subdividing said space into relatively isolated sectors, suction means on said drum for drawing liquid effluent inwardly through the belt into said space, said means including suction passages communicating with the respective sectors.

4. A filtering unit as defined in claim 3 wherein said belt and its guide ribs are formed of elastic material having a resiliently elongated portion disposed both around said discharge roll and between the said roll and the drum, to facilitate the loosening and discharge of the filter cake from the belt and also to deform temporarily the pores of the belt whereby to facilitate the removal of solids therefrom; said traction ribs and grooves being of generally inwardly tapered configuration, the meshing relation between said traction ribs and said traction grooves, together with their tapering configuration, functioning to contract said resiliently elongated portion of the belt incident to its return to the drum.

5. A filtering unit as defined in claim 3, wherein said belt and its guide ribs are of elastic material, means being provided for resiliently elongating said belt in a lengthwise direction at a location between said drum and said discharge roll to deform the pores of the belt, and means for injecting a fluid into said pores while the belt is so resiliently elongated.

References Cited in the file of this patent

UNITED STATES PATENTS

| | | |
|---|---|---|
| 877,631 | Clark | Jan. 28, 1908 |
| 1,880,005 | Wright | Sept. 27, 1932 |
| 2,247,460 | Wright | July 1, 1941 |
| 2,327,226 | Taylor | Aug. 17, 1943 |
| 2,728,239 | Adams | Dec. 27, 1955 |
| 2,770,977 | Beckadolph et al. | Nov. 20, 1956 |
| 2,873,028 | Bried | Feb. 10, 1959 |
| 2,910,185 | Wehner | Oct. 27, 1959 |
| 2,916,145 | Kaiser | Dec. 8, 1959 |
| 2,929,507 | Komline | Mar. 22, 1960 |

FOREIGN PATENTS

| | | |
|---|---|---|
| 315,118 | Switzerland | Sept. 15, 1956 |